(12) United States Patent
Morosawa et al.

(10) Patent No.: US 11,999,293 B2
(45) Date of Patent: Jun. 4, 2024

(54) VEHICLE CONTROL SYSTEM AND VEHICLE CONTROL METHOD

(71) Applicant: HONDA MOTOR CO., LTD., Tokyo (JP)

(72) Inventors: Ryo Morosawa, Tokyo (JP); Haisong Liu, Tokyo (JP); Akira Nakajima, Tokyo (JP); Kenji Okuma, Tokyo (JP); Hiroaki Maruyama, Tokyo (JP); Yoshikazu Matsuo, Tokyo (JP); Shuto Higashi, Tokyo (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 417 days.

(21) Appl. No.: 17/329,458

(22) Filed: May 25, 2021

(65) Prior Publication Data
US 2021/0374433 A1 Dec. 2, 2021

(30) Foreign Application Priority Data

May 27, 2020 (JP) .................................. 2020-092576

(51) Int. Cl.
*B60Q 5/00* (2006.01)
*B60Q 1/50* (2006.01)
(Continued)

(52) U.S. Cl.
CPC ............. *B60Q 5/005* (2013.01); *B60Q 1/509* (2022.05); *B60Q 1/544* (2022.05); *B60Q 9/00* (2013.01);
(Continued)

(58) Field of Classification Search
CPC ........ B60Q 5/005; B60Q 1/509; B60Q 1/544; B60Q 9/00; G06V 20/56; G06V 20/59; H04W 4/48
(Continued)

(56) References Cited

U.S. PATENT DOCUMENTS 10,743,156 B2  8/2020 Ujiie et al.
10,921,813 B2  2/2021 Yasuda et al.
(Continued)

FOREIGN PATENT DOCUMENTS

CN  102449673 A  5/2012
CN  105247587 A  1/2016
(Continued)

OTHER PUBLICATIONS

Japanese Office Action dated Jun. 27, 2023 issued in corresponding Japanese application No. 2020-092576; English machine translation included (6 pages).
(Continued)

*Primary Examiner* — Krishnan Ramesh
(74) *Attorney, Agent, or Firm* — Rankin, Hill & Clark LLP (57) ABSTRACT

In a vehicle control system, when a vehicle peripheral condition recognizing unit recognizes a person outside a vehicle and the vehicle peripheral condition recognizing unit recognizes an in-vehicle user, a notification control unit performs notification processing on outside of the vehicle, based on personal information which is predetermined information relating to the in-vehicle user or an action taken by at least one of the person outside the vehicle and the in-vehicle user.

6 Claims, 9 Drawing Sheets

(51) Int. Cl.
  *B60Q 9/00* (2006.01)
  *G06V 20/56* (2022.01)
  *G06V 20/59* (2022.01)
  *G06V 40/16* (2022.01)
  *G06V 40/18* (2022.01)
  *H04W 4/48* (2018.01)
(52) U.S. Cl.
  CPC .............. *G06V 20/56* (2022.01); *G06V 20/59* (2022.01); *H04W 4/48* (2018.02); *G06V 40/172* (2022.01); *G06V 40/197* (2022.01)
(58) Field of Classification Search
  USPC .......................................................... 701/23
  See application file for complete search history.

(56) References Cited

U.S. PATENT DOCUMENTS

| | | | | |
|---|---|---|---|---|
| 2011/0234422 | A1* | 9/2011 | Yamashita | B60Q 5/006 340/901 |
| 2012/0056734 | A1 | 3/2012 | Ikeda et al. | |
| 2014/0277935 | A1 | 9/2014 | Daman et al. | |
| 2015/0062343 | A1* | 3/2015 | Hwang | G08B 13/19647 348/148 |
| 2017/0124404 | A1* | 5/2017 | Yamane | G06V 40/103 |
| 2019/0039571 | A1 | 2/2019 | Shimizu | |
| 2019/0283711 | A1* | 9/2019 | Moran | B60R 25/31 |
| 2020/0189522 | A1* | 6/2020 | An | H04W 4/40 |
| 2020/0290567 | A1* | 9/2020 | Funyak | B60R 25/102 |
| 2020/0292349 | A1 | 9/2020 | Yamamoto et al. | |
| 2021/0039592 | A1* | 2/2021 | Leedy | B60R 25/305 |
| 2021/0253063 | A1* | 8/2021 | Pupillo | B60R 25/31 |
| 2021/0287017 | A1* | 9/2021 | Turk | G07C 5/0866 |
| 2021/0309183 | A1* | 10/2021 | Bielby | B60K 35/00 |
| 2021/0342611 | A1* | 11/2021 | Kale | G06T 7/74 |
| 2022/0406069 | A1* | 12/2022 | Yamazaki | G06V 40/103 |

FOREIGN PATENT DOCUMENTS

| | | |
|---|---|---|
| CN | 109072634 A | 12/2018 |
| CN | 109937440 A | 6/2019 |
| CN | 110239527 A | 9/2019 |
| JP | 2003-138817 | 5/2003 |
| JP | 2006-192921 A | 7/2006 |
| JP | 2009-208741 A | 9/2009 |
| JP | 2016-507792 A | 3/2016 |
| JP | 2016-141313 A | 8/2016 |
| JP | 2016-211358 A | 12/2016 |
| JP | 2020-144011 A | 9/2020 |

OTHER PUBLICATIONS

Japanese Office Action dated Nov. 21, 2023, Japanese Application No. 2020092576.A, English translation included, 5 pages.
Chinese Office Action dated Jan. 21, 2024, Application No. 202110515873.6, English machine translation included, 14 pages.

* cited by examiner

| MAIN USER (NAME, ATTRIBUTE, etc.) | USER AUTHENTICATION DATA | CONTACT INFORMATION | RELATED PERSON 1 (NAME, ATTRIBUTE, etc.) | RELATED PERSON 1 AUTHENTICATION DATA | RELATED PERSON 1 CONTACT INFORMATION | RELATED PERSON 2 (NAME, ATTRIBUTE, etc.) | RELATED PERSON 2 AUTHENTICATION DATA | RELATED PERSON 2 CONTACT INFORMATION | ... |
|---|---|---|---|---|---|---|---|---|---|
| OWNER | DATA1 | MAIL1 | RELATIVE 1A | DATA1B | MAIL1C | FRIEND 1D | DATA1E | MAIL1F | ... |
| FAMILY 1 | DATA2 | MAIL2 | RELATIVE 2A | DATA2B | MAIL2C | FRIEND 2D | DATA2E | MAIL2F | ... |
| FAMILY 2 | DATA3 | MAIL3 | FRIEND 3A | DATA3B | MAIL3C | FRIEND 3D | DATA3E | MAIL3F | ... |
| FAMILY 3 | DATA4 | MAIL4 | FRIEND 4A | DATA4B | MAIL4C | FRIEND 4D | DATA4E | MAIL4F | ... |

VEHICLE CONTROL SYSTEM AND VEHICLE CONTROL METHOD

INCORPORATION BY REFERENCE

The present application claims priority under 35 U.S.C. § 119 to Japanese Patent Application No. 2020-092576 filed on May 27, 2020. The content of the application is incorporated herein by reference in its entirety.

BACKGROUND

Technical Field

The present invention relates to a vehicle control system and a vehicle control method.

Related Art

There is known an entry system which recognizes whether or not a person around a vehicle is a user of the vehicle from an image around the vehicle taken by a camera, and controls door unlock means of the vehicle according to the recognition result (for example, see JP 2003-138817 A). The entry system identifies whether or not the person around the vehicle is the user of the vehicle according to a degree of coincidence between iris data specified from an image of the person around the vehicle and iris data registered in advance.

SUMMARY

By the way, not only an owner but also various persons such as family members get on the vehicle. For example, in a situation where the owner goes to pick up a family member or the like by a vehicle, it may be useful to recognize the family member or the like around the vehicle by using the recognition technology described in JP 2003-138817 A and to notify the family member or the like from the vehicle.

However, if notification is made every time the family member or the like outside the vehicle is recognized, unnecessary notification may be made. For example, when the family member or the like outside the vehicle is aware of the vehicle, the above notification is unnecessary, and when the owner rents the vehicle to an acquaintance, the above notification is also unnecessary.

The present invention has been made in view of such a background, and it is an object of the present invention to suppress unnecessary notification while notifying a person around a vehicle from the vehicle.

A first aspect for achieving the above object is a vehicle control system that controls operation of a vehicle having a notification function, and the vehicle control system includes a vehicle peripheral condition recognizing unit that recognizes a condition around the vehicle, an in-vehicle condition recognizing unit that recognizes a condition inside the vehicle, and a notification control unit that, when a person outside the vehicle is recognized by the vehicle peripheral condition recognizing unit and an in-vehicle user is recognized by the in-vehicle condition recognizing unit, performs notification processing on outside of the vehicle by using the notification function based on predetermined information relating to the in-vehicle user or an action of at least one of the person and the in-vehicle user.

In the vehicle control system, the notification control unit may perform the notification processing when it is determined that the in-vehicle user takes a first action toward the person outside the vehicle and the person outside the vehicle does not take a second action corresponding to the first action, based on a recognition result by the in-vehicle condition recognizing unit and the vehicle peripheral condition recognizing unit.

In the vehicle control system, the in-vehicle condition recognizing unit may have a personal information acquisition part that acquires personal information of the in-vehicle user recognized, and the notification control unit may perform the notification processing when it is determined based on the personal information that the person recognized by the vehicle peripheral condition recognizing unit is an off-vehicle user having a predetermined relationship with the in-vehicle user.

In the vehicle control system, the vehicle peripheral condition recognizing unit has a time measurement part that measures an elapsed time after recognizing the person outside the vehicle, and a movement amount detection part that measures a movement amount of the person after the elapsed time elapses a first time, and the notification control unit may perform the notification processing when the elapsed time exceeds a second time and the movement amount is a predetermined value or less.

In the vehicle control system, the notification control unit may drive a vehicle electrical component mounted on the vehicle to perform notification processing to the outside of the vehicle by at least one of light and sound.

A second aspect for achieving the above object is a vehicle control method executed by a computer to control operation of a vehicle having a notification function, and the vehicle control method includes a vehicle peripheral condition recognition step of recognizing a condition around the vehicle by a vehicle peripheral condition recognizing unit that recognizes the condition around the vehicle, an in-vehicle condition recognition step of recognizing a condition inside the vehicle by an in-vehicle condition recognizing unit that recognizes the condition inside the vehicle, and a notification control step of, when a person outside the vehicle is recognized in the vehicle peripheral condition recognition step and an in-vehicle user is recognized in the in-vehicle condition recognition step, performing notification processing on outside of the vehicle by using the notification function based on predetermined information relating to the in-vehicle user or an action of at least one of the person and the in-vehicle user.

The present invention enables suppression of unnecessary notification while notifying a person around the vehicle from the vehicle.

DETAILED DESCRIPTION

An embodiment of the present invention is hereinafter described with reference to the drawings.

Figure 1:
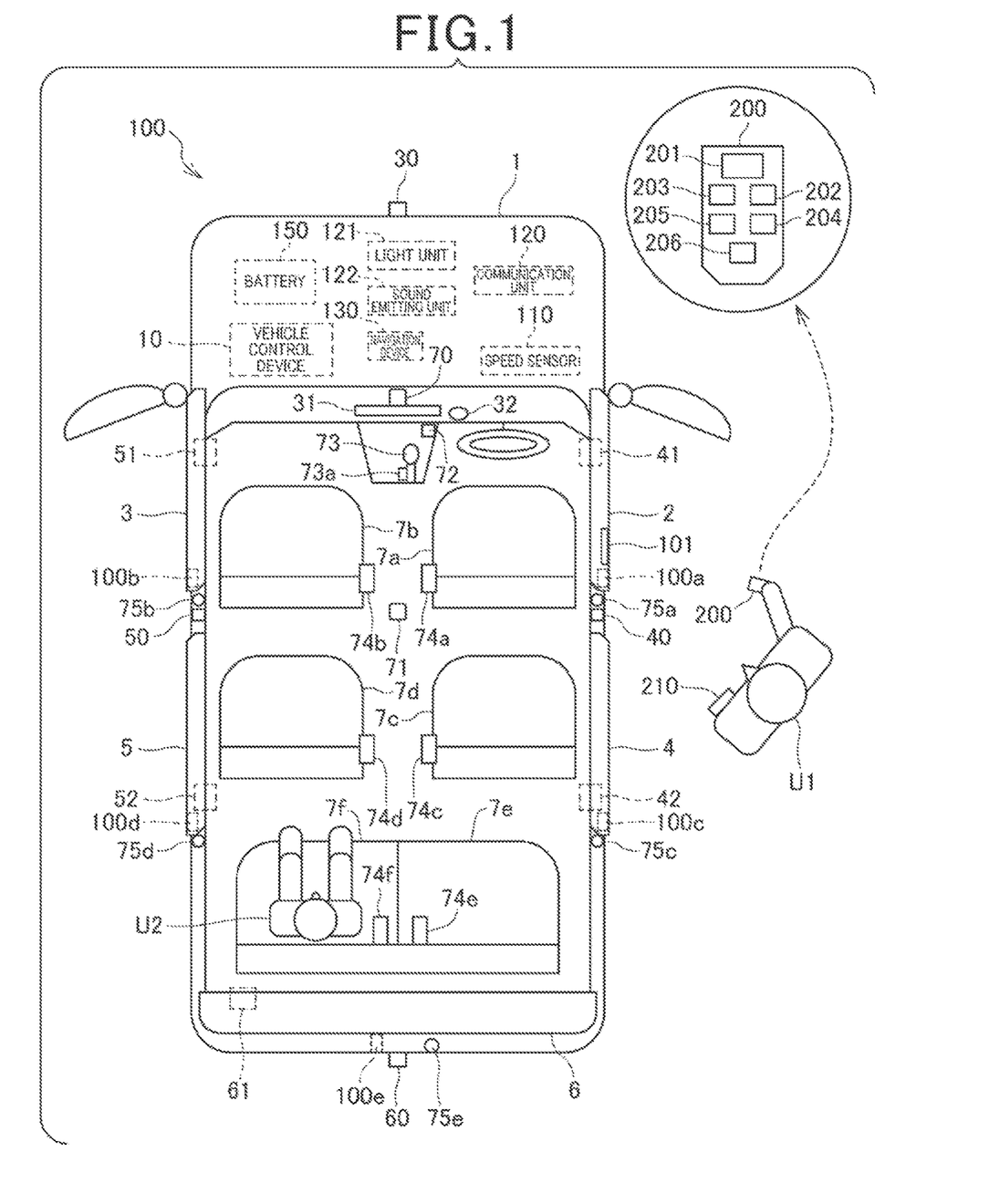
FIG. 1 is a configuration diagram of a vehicle in which a vehicle control system is mounted.

FIG. 1 is a diagram showing a configuration of a vehicle on which a vehicle control system according to the embodiment of the present invention is mounted. The vehicle control system 100 is constituted of a vehicle control device 10 provided in a vehicle 1, after-mentioned sensors and control target parts which are provided in the vehicle 1 and electrically connected to the vehicle control device 20, and the like.

1. Vehicle Configuration

Referring to FIG. 1, a configuration of the vehicle 1 on which the vehicle control device 10 of the present embodiment is mounted will be described. As shown in FIG. 1, the vehicle 1 is a passenger car carrying six persons and includes a driver seat 7a, a passenger seat 7b, a second row right seat 7c, a second row left seat 7d, a third row right seat 7e, and a third row left seat 7f. The seats 7a to 7f are provided respectively with seat belt switches 74a to 74f that detect whether or not a seat belt (not shown) is worn.

The vehicle 1 includes a right power hinged door 2, a left power hinged door 3, a right power slide door 4, a left power slide door 5, and a power tail gate 6. The right power hinged door 2, the left power hinged door 3, the right power slide door 4, the left power slide door 5, and the power tail gate 6 correspond to the door of the present invention. A door knob of the right power hinged door 2 is provided with a door touch sensor 101, and a user U1 having a portable key 200 of the vehicle 1 can unlock the doors 2 to 6 of the vehicle 1 by touching the door touch sensor 101. FIG. 1 shows a case where a user U2 is seated on the third row left seat 7f of the vehicle 1.

The right power hinged door 2 includes a right power hinged door (PHD) driving part 41 that opens, closes, and drives the right power hinged door 2 by an electric actuator (not shown), and the left power hinged door 3 includes a left PHD driving part 51 that opens, closes, and drives the left power hinged door 3 by the electric actuator. The right power slide door 4 includes a right power slide door (PSD) driving part 42 that opens, closes, and drives the right power slide door 4 by the electric actuator, and the left power slide door 5 includes a left PSD driving part 52 that opens, closes, and drives the left power slide door 5 by the electric actuator. The power tail gate 6 includes a power tail gate (PTG) driving part 61 that opens, closes, and drives the power tail gate 6 by the electric actuator.

A front part of the vehicle 1 is provided with a front camera 30 that photographs a forward sight of the vehicle 1, and a rear part of the vehicle 1 is provided with a rear camera 60 that photographs a rearward sight of the vehicle 1. A right side portion of the vehicle 1 is provided with a right side camera 40 that photographs a right sight of the vehicle 1, and a left side portion of the vehicle 1 is provided with a left side camera 50 that photographs a left sight of the vehicle 1. Images of people around the vehicle 1 can be acquired by these cameras 30 to 60. The users of the vehicle 1 include a wide range of persons using the vehicle 1, are not limited to an owner of the vehicle 1, for example, and include a family member and an acquaintance of the owner. In the following description, when it is necessary to give a distinct description according to the fact that the user of the vehicle 1 is inside or outside the vehicle, the user inside the vehicle is indicated as "in-vehicle user", and the user outside the vehicle is indicated as "off-vehicle user".

A dashboard of a cabin compartment is provided with a front seat camera 70 capable of photographing the in-vehicle users seated in the driver seat 7a and the passenger seat 7b, a display 31, and a speaker 32. A ceiling of the cabin compartment is provided with a rear seat camera 71 capable of photographing the in-vehicle users seated in the second row right seat 7c, the second row left seat 7d, the third row right seat 7e, and the third row left seat 7f. The speaker 32 is also provided at a position in the vehicle 1 other than the dashboard, and these speakers 32 can output sound to all the in-vehicle users seated in the respective seats 7a to 7f.

The doors 2 to 5 are provided respectively with door switches 75a to 75d that detect opening and closing of the respective doors. The power tail gate 6 is provided with a door switch 75e that detects opening and closing of the power tail gate 6. In addition, a power switch 72 for giving an instruction on on and off of a battery 150 and a shift switch 73a that detects a shift position of a shift lever 73 are provided near the driver seat 7a. When the battery 150 is on, power is supplied from the battery 150 to a vehicle drive system or the like, and when the battery 150 is off, the power supply from the battery 150 to the vehicle drive system or the like is cut off.

The vehicle 1 further includes door lock mechanisms 100a to 100e that lock the doors 2 to 5 and the power tail gate 6, respectively, a speed sensor 110 that detects a traveling speed of the vehicle 1, a communication unit 120 capable of communicating with the portable key 200, the portable terminal 210 of the user U1, and the like, a light unit 121 capable of outputting light to the outside of the vehicle, a sound emitting unit 122 capable of outputting sound to the outside of the vehicle, and a navigation device 130. The navigation device 130 has a processor, a global positioning system (GPS) sensor, and map data (not shown). The navigation device 130 performs, by the function of the processor, route guidance to a destination or the like based on the position of the vehicle 1 detected by the GPS sensor and the map data.

Under a control of the vehicle control device 10, the communication unit 120 functions as a communication part that transmits an electronic mail or the like to any device having a communication function including the portable terminal 210. The light unit 121 includes a headlight, a position lamp, a blinker lamp, etc., is used during traveling, and can notify the periphery of the vehicle 1 of the position, the presence, etc., of the own vehicle by being driven for light emission by the vehicle control device 10. The light unit 121 may have a presentation light that illuminates the outside of the vehicle (for example, under a side mirror) when an occupant gets on or off the vehicle. The sound emitting unit 122 includes a horn or the like, and can notify the periphery of the vehicle 1 of the position, the presence, etc., of the own vehicle by being driven by the vehicle control device 10. The sound emitting unit 122 may have a sound output device capable of outputting sound outside the vehicle other than the horn.

By utilizing the communication unit 120, the light unit 121, and the sound emitting unit 122, various kinds of information including the position and presence of the vehicle 1 can be provided to the person around the vehicle 1. That is, the communication unit 120, the light unit 121, and the sound emitting unit 122 also function as a notification unit that realizes a notification function of notifying the person around the vehicle 1 of various kinds of information. Electrical components shown in FIGS. 1 and 2 including the notification unit are vehicle electrical components previously installed in the vehicle 1, but may be so-called post-attached electrical components.

2. Configuration of Vehicle Control Device

Figure 2:
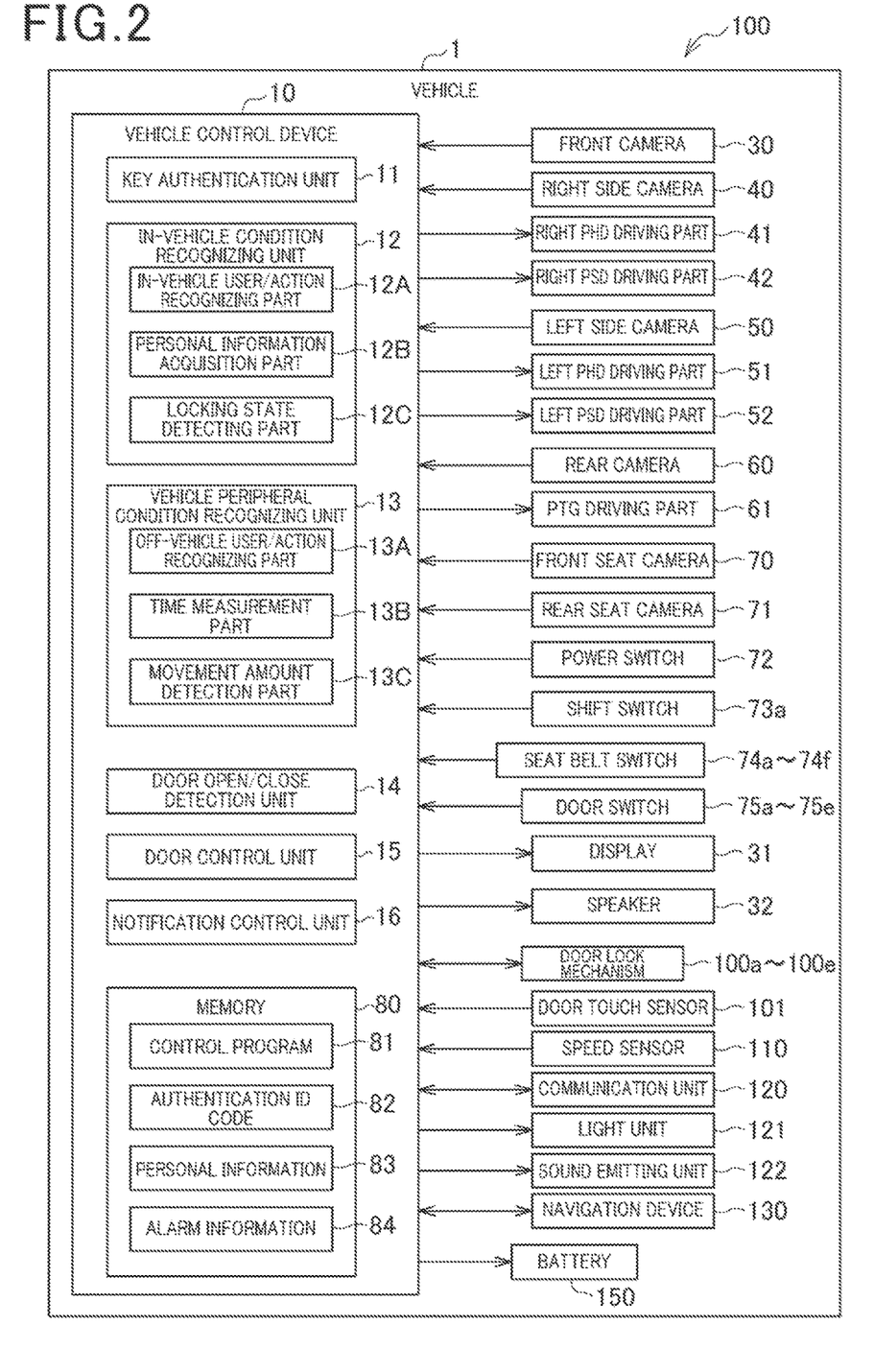
FIG. 2 is a configuration diagram of a vehicle control apparatus.

Referring to FIG. 2, a configuration of the vehicle control device 10 will be described. The vehicle control device 10 is constituted of a processor (CPU: central processing unit) that corresponding to the computer of the present invention (not shown), a memory 80, an interface circuit (not shown), and the like, and is an electronic control unit (ECU) that controls the operation of the vehicle 1.

To the vehicle control device 10, images around the vehicle 1 taken by the front camera 30, the right side camera 40, the left side camera 50, and the rear camera 60 are input. Further, to the vehicle control device 10, images of the inside of the cabin compartment taken by the front seat camera 70 and the rear seat camera 71 are input.

Further, to the vehicle control device 10, detection signals from the power switch 72, the shift switch 73a, the seat belt switches 74a to 74f, and the door switches 75a to 75e, and lock detection signals from the doors 2 to 5 and the power tail gate 6 by door lock sensors (not shown) provided in the door lock mechanisms 100a to 100e are input.

Furthermore, to the vehicle control device 10, a touch detection signal from the door touch sensor 101, a speed detection signal from the speed sensor 110, and information on a current position of the vehicle 1 detected by the navigation device 130 are input.

A control signal output from the vehicle control device 10 controls the operation of a right PHD driving part 41, a right PSD driving part 42, the left PHD driving part 51, the left PSD driving part 52, a PTG driving part 61, the door lock mechanisms 100a to 100e, and the battery 150. Furthermore, the control signal output from the vehicle control device 10 controls a screen display of the display 31 and the sound (voice guidance, chime sound, alarm, etc.) output from the speaker 32. The vehicle control device 10 communicates, via the communication unit 120, with the portable key 200 possessed by the user U1 and the portable terminal 210.

The CPU reads and executes a control program 81 of the vehicle control device 10, which is stored in the memory 80, to function as a key authentication unit 11, an in-vehicle condition recognizing unit 12, a vehicle peripheral condition recognizing unit 13, a door open/close detection unit 14, a door control unit 15, and a notification control unit 16. The control program 81 includes a vehicle control program of the present invention. The memory 80 stores an authentication ID code 82 used for authentication of the portable key 200, user's personal information 83, alarm information 84 used for alarm processing, and the like.

The authentication ID code 82 is a code that specifies the portable key 200 associated with the vehicle 1. The personal information 83 has personal information on a main user who frequently uses the vehicle 1 (including, for example, a family living with the user U1 without limited to the user U1). The number of main users may be one. The personal information 83 is used for identification of the in-vehicle user and identification of an off-vehicle user having a certain relationship (such as family relationships and friendship relationships) with the in-vehicle user.

Figure 3:
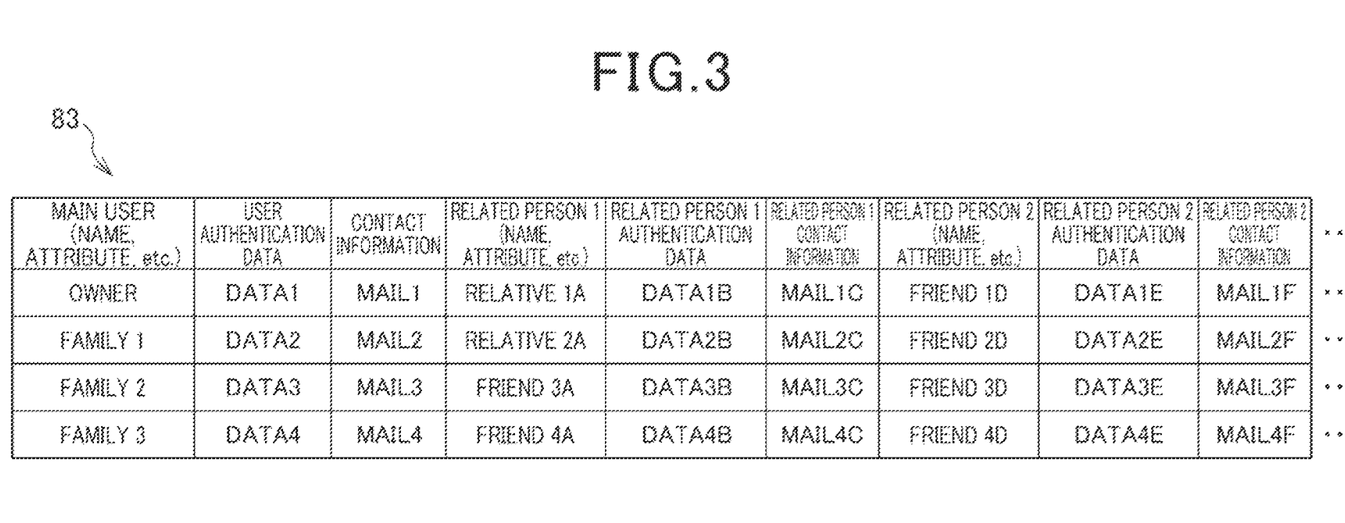
FIG. 3 is a diagram showing an example of personal information.

FIG. 3 shows an example of the personal information 83.

As shown in FIG. 3, the personal information 83 is personal information of four main users including the owner of the vehicle 1 and his/her family, and each personal information includes information (names and attributes, authentication data, and information that enables identification of contact information and the like) relating to the main user and information (names and attributes, and information that enables identification of authentication data and the like) relating to a sub-user (relatives and friends) as a related person having a predetermined relationship with the main user. Although the authentication data is a face image used for personal authentication or feature data of a face, the authentication data may be other information capable of personal authentication. The authentication data may be included in the personal information 83 or may be stored as data independent of the personal information 83 in the memory 80. The contact information is contact information with which notification can be made to each of the main user and the sub user by using communication, and is, for example, an address of a mail which can be received by a portable terminal of each user.

That is, the personal information 83 describes information relating to a person who can be the in-vehicle user and a person (main user and sub user) having a relationship with the in-vehicle user. By using the personal information 83, it becomes possible to specify the person and to transmit an electronic mail to the person. These pieces of personal information 83 may be information directly input by the main user or the like, or may be information in which information stored in a portable terminal or the like of each main user is prepared from information acquired via the communication unit 120 or the like.

The alarm information 84 stores information relating to alarm contents and the like at the time of alarm processing and stores, for example, text information indicating the alarm contents. The alarm contents and the like may be made editable by a user. The contents of the alarm information 84 may be described in the control program 81.

As shown in FIG. 1, when the user U1 having the portable key 200 approaches the vehicle 1, the key authentication unit 11 communicates with the portable key 200 via the communication unit 120 to receive an ID code from the portable key 200. Then, the key authentication unit 11 permits the user U1 to use the vehicle 1 when the received ID code matches the authentication ID code 82 stored in the memory 80.

As shown in FIG. 1, the portable key 200 includes a locking/unlocking button 201 for giving an instruction for locking and unlocking of the vehicle 1, a right power hinged door button 202 for giving an instruction for opening and closing of the right power hinged door 2, a left power hinged door button 203 for giving an instruction for opening and closing of the left power hinged door 3, a right power slide door button 204 for giving an instruction for opening and closing of the right power slide door 4, a left power slide door button 205 for giving an instruction for opening and closing of the left power slide door 5, and a power tail gate button 206 for giving an instruction for opening and closing of the power tail gate 6. Hereinafter, the right power hinged door 2, the left power hinged door 3, the right power slide door 4, the left power slide door 5, and the power tail gate 6 are collectively referred to as electric doors.

The user U1 operates the locking/unlocking button 201 of the portable key 200 to unlock each of the doors 2 to 6 of the vehicle 1, and can get on the vehicle 1. The user U1 can instruct the vehicle 1 to open and close the electric door by operating the buttons 202 to 206 of the portable key 200. The user U1 who has got on the vehicle 1 with the portable key 200 turns on the power switch 72 to start the vehicle 1 and starts using the vehicle 1.

An in-vehicle condition recognizing unit 12 recognizes the condition in the vehicle 1 based on an image imaged by an in-vehicle photographing camera including the front seat camera 70 and the rear seat camera 71. The CPU, as function of the in-vehicle condition recognizing unit 12, further functions as an in-vehicle user/action recognizing part 12A, a personal information acquisition part 12B, and a locking state detection part 12C. The in-vehicle user/action recognizing part 12A recognizes the in-vehicle user based on the images imaged by the front seat camera 70 and the rear seat camera 71, and recognizes an action of the recognized in-vehicle user.

For example, regarding the recognition of the in-vehicle user, the face of the in-vehicle user is recognized from the images taken by the in-vehicle cameras 70 and 71, and based on each authentication data in the personal information 83, which person in the personal information 83 is specified by using a known face authentication technique. Other authentication techniques such as iris authentication may be applied instead of face authentication. In the recognition of the action of the in-vehicle user, a motion of the upper body including the face, hands, and arms of the in-vehicle user is mainly recognized from a taken image by using a known image recognition technology, and, for example, various actions such as body gestures, hand gestures, changes in facial expressions, the face direction, and the line of sight are recognized.

The personal information acquisition part 12B acquires the personal information 38 of the recognized in-vehicle user from the personal information 38 stored in the memory 80, based on a recognition result of the in-vehicle user by the in-vehicle user/action recognizing part 12A. The locking state detection part 12C obtains operating states of the door lock mechanisms 100a to 100e to detect whether or not each of the doors 2 to 5 is in a locking state.

The vehicle peripheral condition recognizing unit 13 recognizes a peripheral condition of the vehicle 1 based on an image taken by an off-vehicle photographing camera including the front camera 30, the right side camera 40, the left side camera 50, and the rear camera 60. The CPU, as function of the vehicle peripheral condition recognizing unit 13, further functions as an off-vehicle user/action recognizing part 13A, a time measurement part 13B, and a movement amount detection part 13C. The off-vehicle user/action recognizing part 13A recognizes a person outside the vehicle (including others than the off-vehicle user) based on images imaged by the off-vehicle photographing cameras 30 to 60, and recognizes an action of the recognized person outside the vehicle.

Regarding recognition of the person outside the vehicle, the person around the vehicle 1 is recognized from the images imaged on the front, rear, right and left sides of the vehicle 1, and based on each authentication data in the personal information 83, whether or not the recognized person corresponds to which person in the personal information 83 is specified. The off-vehicle photographing cameras 30 to 60 can photograph up to dozens of meters ahead of the vehicle 1, and can recognize a person within a range of dozens of meters based on the vehicle 1. A recognition range can be changed appropriately. Known recognition techniques can be widely applied to person recognition techniques.

In the recognition of the action of the person outside the vehicle, a motion of the upper body including the face of the person outside the vehicle and a motion of the lower body are recognized from a taken image, and, for example, various actions such as body gestures, hand gestures, changes in facial expressions, the face direction, the line of sight, walking, and stopping are recognized. Known image recognition techniques can be widely applied to this recognition technique.

Each time a new person outside the vehicle is detected, the time measurement part 13B measures the elapsed time to measure the elapsed time after the recognition of each person. Thus, the elapsed time is measured for every off-vehicle person located around the vehicle 1. If no person outside the vehicle is detected for a specified time (for example, 10 minutes) or more, the measurement of the elapsed time for the person outside the vehicle is stopped.

The movement amount detection part 13C measures a movement amount of the detected person outside the vehicle. The movement amount may be measured so as to determine that a movement range of the person outside the vehicle is relatively large or small, and the measurement may have an error of about several centimeters to several meters. The determination that the movement range of the person outside the vehicle is relatively large or small is performed to discriminate whether or not the action of the person outside the vehicle is an action (action performed when an appointed person is not found, and the action is hereinafter referred to as "indecisive action") taken when the person outside the vehicle finds someone (including searching the vehicle).

In the present embodiment, the movement amount based on a point where the person outside the vehicle stops is measured, and it is determined as "during the indecisive action" while the measured movement amount is within a predetermined threshold value.

The door open/close detection unit 14 detects open/close states of the doors 2 to 5 based on operating states of the door switches 75a to 75d. The door control unit 15 controls each of the right PHD driving part 41, the right PSD driving part 42, the left PHD driving part 51, the left PSD driving part 52, the PTG driving part 61, and the door lock mechanisms 100a to 100e and thereby controls operating components associated with the doors 2 to 5. The notification control unit 16 appropriately performs notification processing toward the inside and outside of the vehicle by using the display 31, the speaker 32, the communication unit 120, the light unit 121, and the sound emitting unit 122.

The notification processing performed by the notification control unit 16 includes first notification processing, second notification processing, and third notification processing performed on a person around the vehicle 1. The user of the vehicle 1 can appropriately select which of the first to third notification processing is executed. Each notification processing may be started according to a user's instruction, or may be automatically executed when the vehicle 1 enters a parking state (for example, a shift position is at a parking position).

3. First Notification Processing

Figure 4:
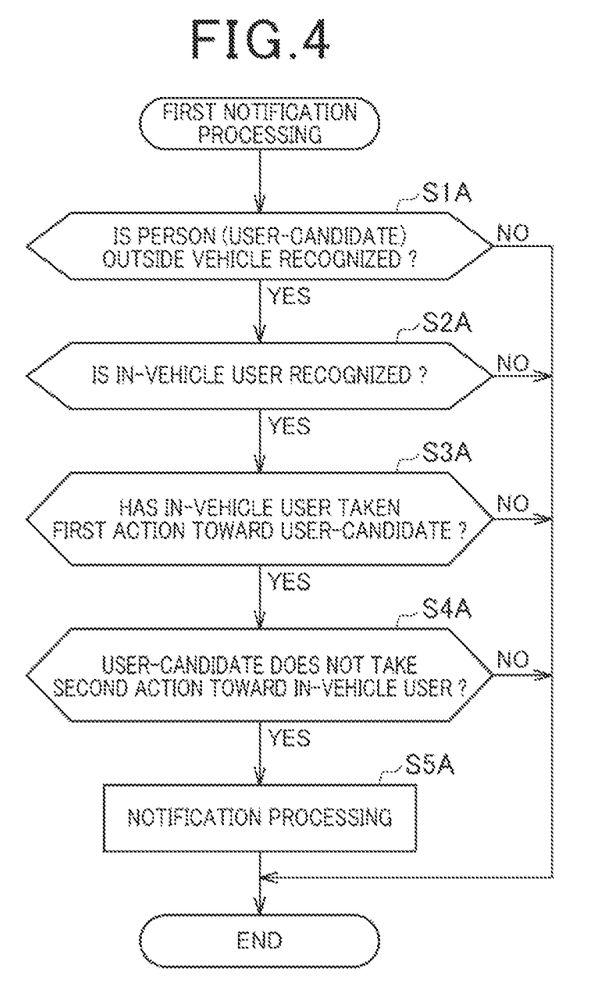
FIG. 4 is a flowchart showing first notification processing.
Figure 5:
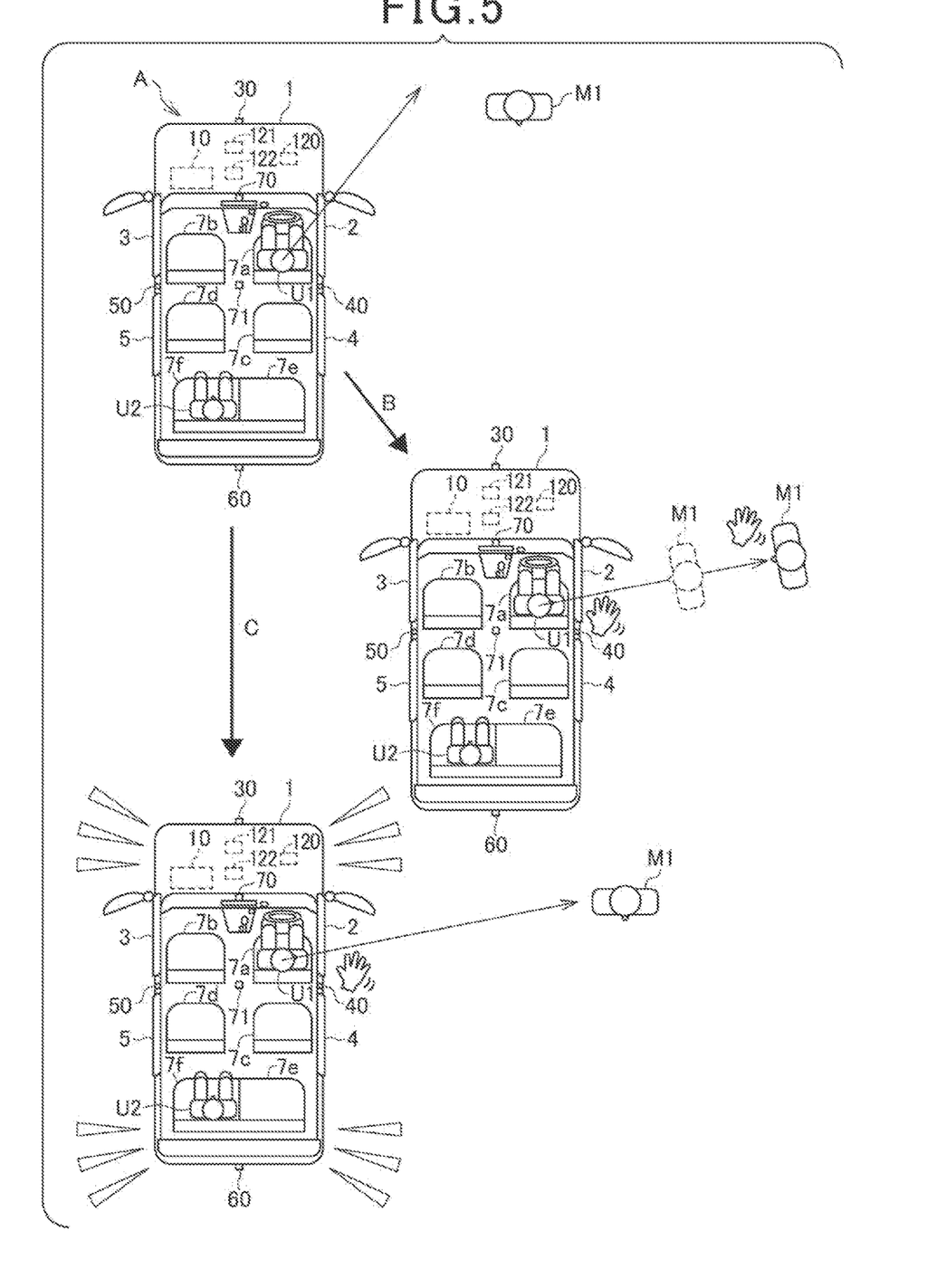
FIG. 5 is a diagram for explaining the first notification processing.

FIG. 4 is a flowchart showing the first notification processing. FIG. 5 is a diagram for explaining the first notification processing. The flowchart shown in FIG. 4 will be described with reference to FIG. 5. When the first to third notification processings are started, photographing by the off-vehicle photographing cameras 30 to 60 and the in-vehicle photographing cameras 70 and 71 is started, and recognition processing by the in-vehicle condition recognizing unit 12 and the vehicle peripheral condition recognizing unit 13 is started.

First, in the notification control unit 16, the vehicle peripheral condition recognizing unit 13 determines whether or not a person Ml (see FIG. 5) around the vehicle 1, that is, the person Ml outside the vehicle is recognized (step S1A). Since the vehicle peripheral condition recognizing unit 13 recognizes the person M1 outside the vehicle based on the images taken by the off-vehicle photographing cameras 30 to 60, all the persons M1 outside the vehicle located in the photographing ranges of the off-vehicle photographing cameras 30 to 60 can be recognized. Thus, all the persons Ml within the range of dozens of meters based on the vehicle 1 are recognized. Each of the recognized persons M1 may be a user relating to the vehicle 1 or another person not relating to the vehicle 1, and is appropriately expressed as "user-candidate" hereinafter.

When the user-candidate M1 outside the vehicle is recognized (step S1A; YES), the notification control unit 16 determines whether or not the in-vehicle user is recognized by the in-vehicle condition recognizing unit 12 (step S2A). Reference numeral A in FIG. 5 shows a case where one user-candidate M1 is recognized and two in-vehicle users U1 and U2 are recognized.

When the user-candidate M1 outside the vehicle is recognized (step S1A; YES) and the in-vehicle user is recognized (step S2A; YES), the notification control unit 16 executes the process of step S3A. On the other hand, when at least one of the user-candidate M1 outside the vehicle and the in-vehicle user is not recognized, the notification control unit 16 temporarily ends the first notification processing and executes the first notification processing at a prescribed cycle.

In step S3A, the notification control unit 16 monitors, by the in-vehicle condition recognizing unit 12, whether or not the in-vehicle user has taken a preset first action toward the user-candidate M1 outside the vehicle. The first action is set to an action taken by the in-vehicle user to an acquaintance. The first action of the present embodiment includes both an action of directing at least one of the face and the line of sight to the user-candidate M1 by any in-vehicle user and an action of waving a hand toward the user-candidate M1.

In FIG. 5, the direction of the face of the in-vehicle user U1 seated in the driver seat 7a is indicated by an arrow. In reference numeral A in FIG. 5, neither the in-vehicle user U1 nor the in-vehicle user U2 takes the first action. If this situation continues, the determination of step S3A becomes negative once the user-candidate M1 is no longer recognized, and the notification control unit 16 temporarily ends the first notification processing and executes the first notification processing at a predetermined cycle Reference numerals B and C in FIG. 5 show a case where the in-vehicle user U1 turns his/her face toward the user-candidate M1 and waves his/her hand toward the user-candidate M1. In this case, since the determination in step S3A becomes positive, as shown in FIG. 4, the notification control unit 16 shifts to the process of step S4A, and determines whether or not the user-candidate M1 who has taken the first action has taken a preset second action toward the in-vehicle user U1 who has taken the first action.

The second action is set to an action taken by the user-candidate M1 to an acquaintance. The second action of the present embodiment includes both an action of directing at least one of the face and the line of sight to the user-candidate M1 by the user-candidate M1 and an action of waving a hand toward the in-vehicle user or approaching the in-vehicle user.

Reference numeral B in FIG. 5 shows a case where the user-candidate M1 turns his/her face toward the in-vehicle user U1 and waves his/her hand toward the user-candidate M1 or approaches the user-candidate M1. In this case, since the determination in step S4A becomes negative, as shown in FIG. 4, the notification control unit 16 temporarily ends the first notification processing. That is, when the user-candidate M1 has taken the second action, since it is obvious that the user-candidate M1 is aware of the presence of the vehicle 1 including the in-vehicle user U1, the notification processing of notifying the user-candidate M1 of the presence of the vehicle 1 is not executed.

Reference numeral C in FIG. 5 shows a case where the user-candidate M1 does not take the second action, that is, a case where the user-candidate M1 is not aware of the presence of the vehicle 1 including the in-vehicle user U1. In this case, since the determination in step S4A becomes positive, as shown in FIG. 4, the notification control unit 16 executes the notification processing (step S5A).

In the notification processing in step S5A, the periphery of the vehicle 1 is notified of the presence of the vehicle 1 by operating the light unit 121 and the sound emitting unit 122. Thus, the user-candidate M1 is easily aware of the vehicle 1 and the in-vehicle user U1 in the vehicle 1. Therefore, the in-vehicle user U1 makes the person outside the vehicle who has taken the first action easier to notice the vehicle 1 and the in-vehicle user U1.

The content of the notification processing in step S5A may be changed as appropriate. For example, only the sound emitting unit 122 may be operated in the daytime, and the light unit 121 may not be operated. The notification processing in step S5A may include processing of notifying a portable terminal of the user-candidate M1 outside the vehicle. For example, the vehicle peripheral condition recognizing unit 13 may specify contact information (for example, an e-mail address) of the user-candidate M1 based on the personal information 38 stored in the memory 80, and may perform processing of transmitting predetermined information capable of notifying the portable terminal of the vehicle 1, etc. (for example, processing of sending electronic mail) by using the contact information.

While light or sound is output toward the outside of the vehicle by using the light unit 121 or the sound emitting unit 122, the in-vehicle user may be notified of the fact that the output is being performed by using at least one of the display 31 and the speaker 32 in the vehicle shown in FIG. 1, etc. In addition, in the notification processing in step S5A, under the control of the notification control unit 16, a control may be included to unlock one of the doors 2 to 5 or to open the electric door so that the in-vehicle user U1 who has taken the first action can easily go out of the vehicle. By unlocking the door or opening the electric door, the in-vehicle user can easily move to the user-candidate M1 who has not been aware of the in-vehicle user or can easily talk to the user-candidate M1. The user-candidate M1 outside the vehicle easily gets on the vehicle 1.

The processes of steps S1A and S3A correspond to "vehicle peripheral condition recognition step" of the present invention, the processes of steps S2A and S4A correspond to "in-vehicle condition recognition step" of the present invention, and the process of step S5A corresponds to "notification control step" of the present invention.

4. Second Notification Processing

Figure 6:
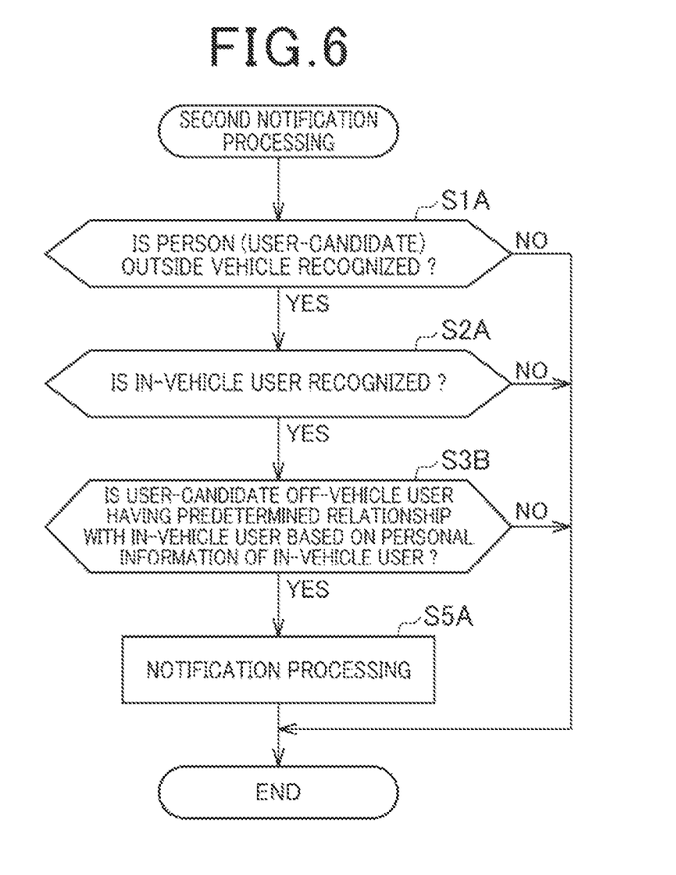
FIG. 6 is a flowchart showing second notification processing.
Figure 7:
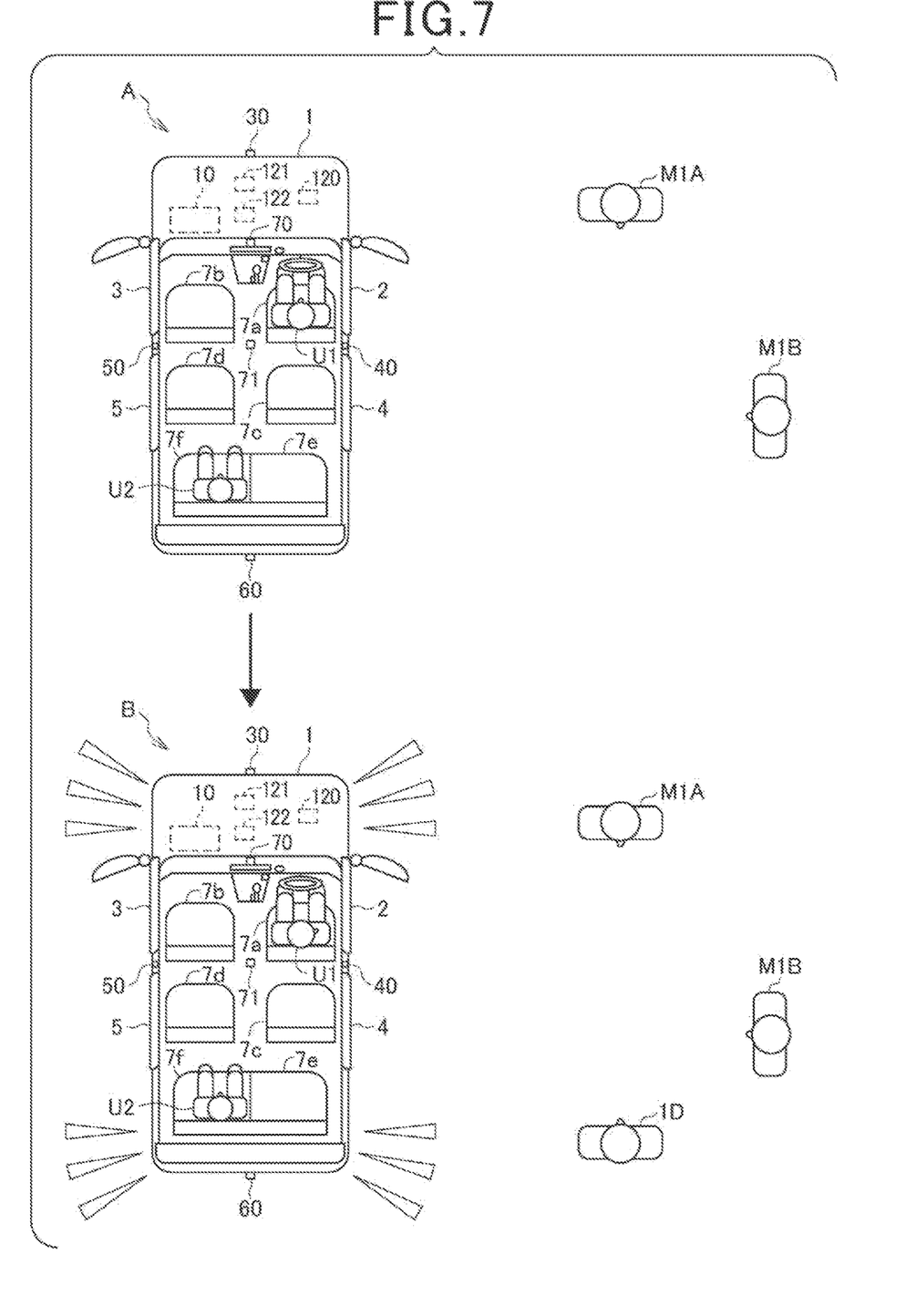
FIG. 7 is a diagram for explaining the second notification processing.

FIG. 6 is a flowchart showing the second notification processing. Steps similar to those of the first notification processing are denoted by the same reference numerals, and duplicate description thereof will be omitted. FIG. 7 is a diagram for explaining the second notification processing. The flowchart shown in FIG. 6 will be described with reference to FIG. 7.

When the user-candidate M1 outside the vehicle is recognized by the vehicle peripheral condition recognizing unit 13 (step S1A; YES) and the in-vehicle user is recognized by the in-vehicle condition recognizing unit 12 (step S2A; YES), the notification control unit 16 executes the process of step S3B.

In step S3B, the notification control unit 16 acquires the personal information 38 of the in-vehicle user recognized by the in-vehicle condition recognizing unit 12, and determines, based on the acquired personal information 38, whether or not the user-candidate Ml is an off-vehicle user having a predetermined relationship with the in-vehicle user. In step S3B, the personal information acquisition part 12B acquires the personal information 38 in which the recognized in-vehicle user is the main user and determines, by the off-vehicle user/action recognizing part 13A, whether or not the user-candidate Ml is included in the sub user described in the acquired personal information 38.

Reference numeral A in FIG. 7 shows a case where either the in-vehicle user U1 or the in-vehicle user U2 is the owner in FIG. 3, and persons M1A and M1B not described in the personal information 38 of the owner are located around the vehicle 1. In this case, the determination in step S3B becomes negative, and, as shown in FIG. 6, the notification control unit 16 temporarily ends the second notification processing and executes the second notification processing at a predetermined cycle.

On the other hand, reference numeral B in FIG. 7 shows a case where a friend 1D (see FIG. 3) described in the personal information 38 of the owner is located around the vehicle 1. In this case, the determination in step S3B becomes positive, and, as shown in FIG. 6, the notification control unit 16 executes the notification processing in step S5A. Thus, the friend 1D of the in-vehicle user U1 is easily aware of the vehicle 1 and the in-vehicle user U1 in the vehicle 1. The in-vehicle user U1 is also easily aware that the friend 1D is present around the vehicle 1.

If either the user-candidate M1A or the user-candidate M1B outside the vehicle is either a friend 3A or 3D (see FIG. 3) described in the personal information 38 of the other in-vehicle user U2 in the condition indicated by the reference numeral A in FIG. 7, the determination in step S3B becomes positive, and the notification processing in step S5A is executed.

That is, when an off-vehicle user having a relationship with any in-vehicle user is located around the vehicle 1, the notification processing to the outside of the vehicle is automatically performed. On the other hand, when the in-vehicle users U1 and U2 are not present, the notification processing to the outside of the vehicle is not executed even if the friends 1D, 3A, and 3D are located around the vehicle 1. Therefore, it is possible to avoid a situation where a person outside the vehicle who has no relationship with the in-vehicle user is notified of the vehicle 1, and to suppress unnecessary notification.

The processes of steps S1A and S3B correspond to "vehicle peripheral condition recognition step" of the present invention, the process of step S2A corresponds to "in-vehicle condition recognition step" of the present invention, and the process of step S5A corresponds to "notification control step" of the present invention.

5. Third Notification Processing

Figure 8:
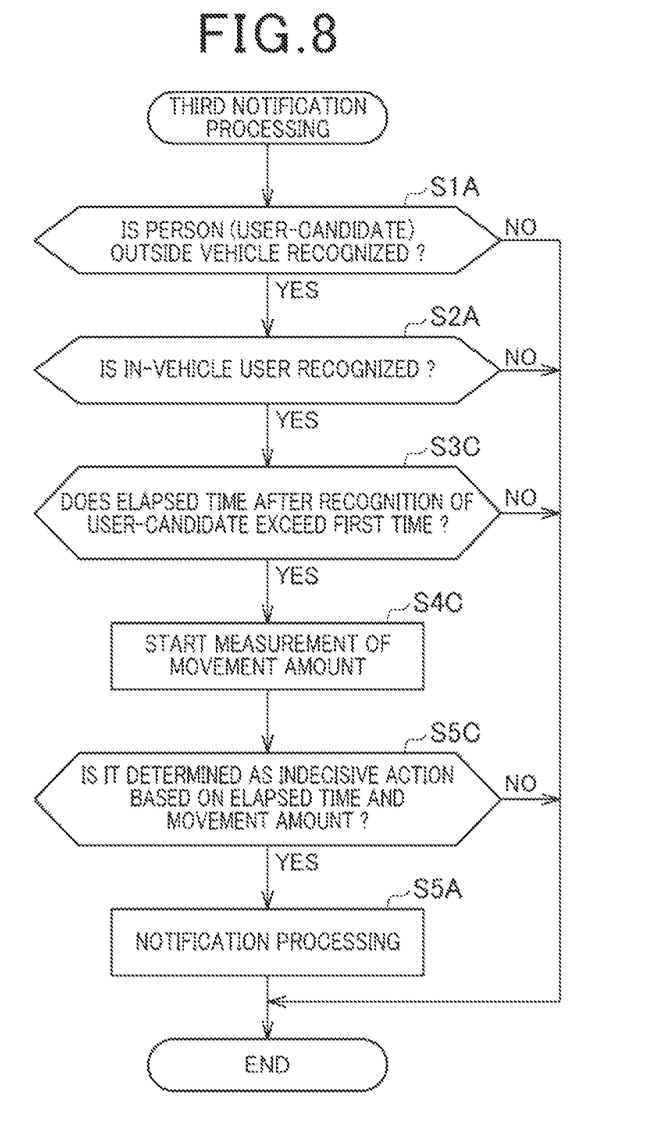
FIG. 8 is a flowchart showing third notification processing.
Figure 9:
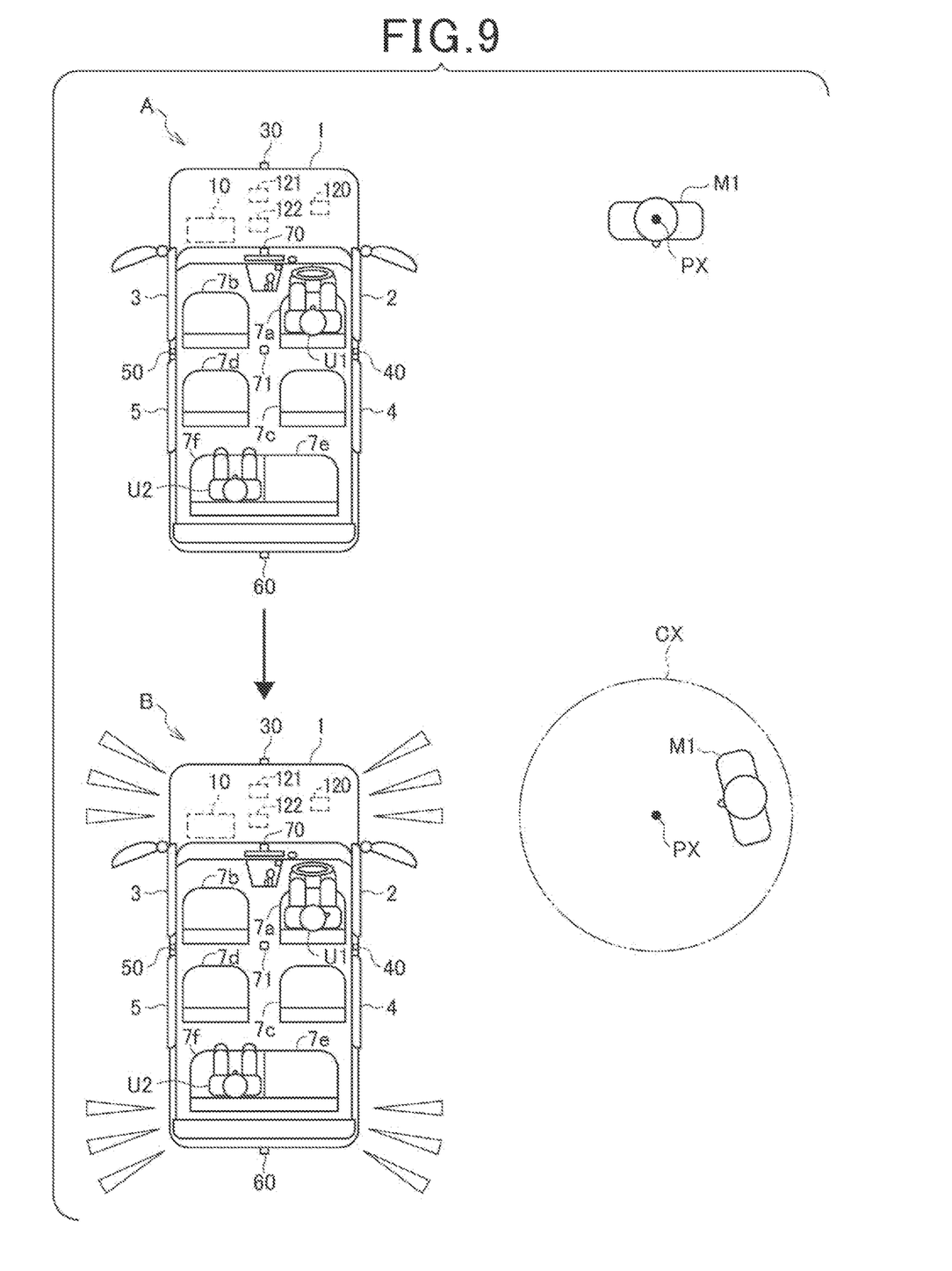
FIG. 9 is a diagram for explaining the third notification processing.

FIG. 8 is a flowchart showing the third notification processing. Steps similar to those of the first notification processing are denoted by the same reference numerals, and duplicate description thereof will be omitted. FIG. 9 is a diagram for explaining the third notification processing. The flowchart shown in FIG. 8 will be described with reference to FIG. 9.

When the user-candidate M1 outside the vehicle is recognized by the vehicle peripheral condition recognizing unit 13 (step S1A; YES) and the in-vehicle user is recognized by the in-vehicle condition recognizing unit 12 (step S2A; YES), the notification control unit 16 executes the process of step S3C.

In step S3C, the notification control unit 16 determines, by the time measurement part 13B of the vehicle peripheral condition recognizing unit 13, whether or not the elapsed time after recognition of the user-candidate M1 outside the vehicle exceeds a preset first time. The first time is set to, for example, approximately an average waiting time (for example, values in a range of 5 minutes to 10 minutes) in the case of appointment. If the elapsed time exceeds the first time (step S3C; YES), the notification control unit 16 starts measuring the movement amount of the user-candidate M1 by the movement amount detection part 13C (step S4C). Next, the notification control unit 16 determines whether or not the user-candidate M1 takes the "indecisive action" based on both the ongoing elapsed time and the movement amount (step S5C). In step S5C, when the elapsed time exceeds a second time (for example, values in the range of 10 minutes to 30 minutes) longer than the first time and the movement amount is within a predetermined threshold value (for example, within a few meters from a point where the user-candidate M1 has stopped), it is determined that "indecisive action" is taken.

Reference numeral A in FIG. 9 shows a condition until the second time elapses after the user-candidate M1 outside the vehicle is recognized. In this case, after the elapse of the first time, the movement amount based on a point PX where the user-candidate M1 has stopped is measured by the movement amount detection part 13C. Reference numeral B in FIG. 9 shows a case where the user-candidate M1 takes the "indecisive action" after the elapse of the second time, that is, a case where the movement amount of the user-candidate M1 is within a threshold value CX centering on the point PX. In the case of the reference numeral B in FIG. 9, the determination in step S5C becomes positive, and, as shown in FIG. 8, the notification control unit 16 executes the notification processing in step S5A. Thus, when a person taking the "indecisive action" is outside the vehicle, the person is easily aware of the vehicle 1. The in-vehicle user U1 is also easily aware that an appointed person is present around the vehicle 1.

The processes of steps S1A and S3C to S5C correspond to "vehicle peripheral condition recognition step" of the present invention, the process of step S2A corresponds to "in-vehicle condition recognition step" of the present invention, and the process of step S5A corresponds to "notification control step" of the present invention.

As described above, in the vehicle control system 100, when the vehicle peripheral condition recognizing unit 13 recognizes the user-candidate M1 outside the vehicle and the vehicle peripheral condition recognizing unit 13 recognizes the in-vehicle user, the notification control unit 16 performs the notification processing on the outside of the vehicle by using the notification function according to one of the light unit 121, the sound emitting unit 122, and the communication unit 120, based on the personal information 38 which is predetermined information relating to the in-vehicle user or the action taken by at least one of the user-candidate M1 outside the vehicle and the in-vehicle user. Thus, it is possible to suppress unnecessary notification while notifying a person (user-candidate M1) around the vehicle 1 from the vehicle 1.

In addition, in the first notification processing, the notification control unit 16 performs the notification processing on the outside of the vehicle when it is determined that the in-vehicle user takes the first action toward the user-candidate M1 outside the vehicle and the user-candidate M1 does not take the second action corresponding to the first action, based on the recognition result by the in-vehicle condition recognizing unit 12 and the vehicle peripheral condition recognizing unit 13. Thus, when the in-vehicle user takes the first action toward the person (user-candidate M1) outside the vehicle and the person outside the vehicle is not aware of the first action, the person outside the vehicle can be notified from the vehicle 1. Since the notification processing is not performed when the person outside the vehicle takes the second action, unnecessary notification can be effectively reduced.

In the second notification processing, the notification control unit 16 performs the notification processing on the outside of the vehicle when the personal information 38 of the in-vehicle user is acquired and it is determined that the user-candidate M1 outside the vehicle recognized based on the acquired personal information 38 is the off-vehicle user having a predetermined relationship with the in-vehicle user. Thus, the person (user-candidate M1) outside the vehicle who has a relationship with the in-vehicle user can be notified from the vehicle 1, and it is possible to effectively avoid the situation where a person outside the vehicle who has no relationship with the in-vehicle user is notified.

In the third notification processing, when the elapsed time after recognition of the user-candidate M1 outside the vehicle exceeds the second time and the movement amount of the user-candidate M1 is a predetermined value or less, the notification control unit 16 regards this case as the "indecisive action" and performs the notification processing on the outside of the vehicle. Thus, it is possible to effectively avoid a situation where a person (user-candidate M1) outside the vehicle who does not take the "indecisive action" is notified.

In the first to third notification processing, when the notification processing in step S5A includes the processing of notifying the portable terminal carried by the user-candidate M1 outside the vehicle, the person outside the vehicle can be easily notified of the presence of the vehicle 1 or the like even in an environment (for example, daytime with strong sunlight or noisy environment) where the person (user-candidate M1) outside the vehicle is hard to be aware of the vehicle 1 by only the light unit 121 and the sound emitting unit 122.

Since the notification control unit 16 drives the vehicle electrical components mounted on the vehicle 1 and performs the notification processing on the outside of the vehicle by at least one of light and sound, the notification processing to the outside of the vehicle can be performed without attaching another electrical component. As described above, the notification processing to the outside of the vehicle may be performed by post-attached electrical components.

The present invention is not limited to the configuration of the above embodiment, and can be practiced in various embodiments without departing from the gist thereof.

In the above embodiment, the case where the present invention is applied to the vehicle control system 100 shown in FIG. 1, etc. and the vehicle control method has been described, but the present invention is not limited thereto. For example, part of the processing of the vehicle control system 100 may be performed by another device such as a server connected to the vehicle control device 10 via a communication network. Among the first to third notification processing, processing (for example, processing performed by the in-vehicle condition recognizing unit 12 and the vehicle peripheral condition recognizing unit 13) in which the calculation amount relatively increases is performed by a server, whereby the calculation amount of the vehicle control device 10 can be reduced, and higher accurate user recognition and action recognition can be easily adopted.

The configuration of each component shown in FIG. 2 may be realized by hardware or by cooperation of hardware and software. The way of division of processing units of each flowchart and the processing order are not limited to the illustrated example.

The control program 81 may be stored in an external device or a device and acquired via the communication unit 120 and the like. The control program 81 may be stored on a recording medium stored in a computer-readable manner. As the recording medium, a magnetic or optical recording medium or a semiconductor memory device can be used. Specifically, examples of the recording medium include a portable type or fixed type recording medium such as a flexible disk, various optical disks, a magneto-optical disk, a flash memory, and a card type recording medium. Further, the recording medium may be a nonvolatile storage device such as a RAM, a ROM, or an HDD which is an internal storage device included in an image display device.

REFERENCE SIGNS LIST

1 Vehicle
2 Right power hinged door
3 Left power hinged door
4 Right power slide door
5 Left power slide door
6 Power tail gate
10 Vehicle control device
11 Key authentication unit
12 In-vehicle condition recognizing unit
12A In-vehicle user/action recognizing part
12B Personal information acquisition part
12C Locking state detection part
13 Vehicle peripheral condition recognizing unit
13A Off-vehicle user/action recognizing part
13B Time measurement part
13C Movement amount detection part
14 Door open/close detection unit
15 Door control unit
16 Notification control unit
30 Front camera (off-vehicle photographing camera)
40 Right side camera (off-vehicle photographing camera)
50 Left side camera (off-vehicle photographing camera)
60 Rear camera (off-vehicle photographing camera)
70 Front seat camera (in-vehicle photographing camera)

71 Rear seat camera (in-vehicle photographing camera)
80 Memory
81 Control program
83 Personal information
84 Alarm information
100 Vehicle control system
120 Communication unit (Communication part and notification unit)
121 Light unit (notification unit)
122 Sound emitting unit (notification unit)
130 Navigation device
150 Battery
U1, U2 User (in-vehicle user)
M1, M1A, M1B Person outside vehicle (user-candidate, off-vehicle user)
PX Point where person M1 has stopped
CX Threshold value centering on point PX

What is claimed is:

1. A vehicle control system that controls operation of a vehicle having a notification function, the vehicle control system comprising a processor, the processor comprising:
a vehicle peripheral condition recognizing unit that recognizes a condition around the vehicle based on an image taken by an off-vehicle photographing camera which photographs a periphery of an outside of the vehicle;
an in-vehicle condition recognizing unit that recognizes a condition inside the vehicle based on an image imaged by an in-vehicle photographing camera which photographs an inside of the vehicle; and
a notification control unit that, when a person outside the vehicle is recognized, from the image taken by the off-vehicle photographing camera, by the vehicle peripheral condition recognizing unit and an in-vehicle user is recognized, from the image imaged by the in-vehicle photographing camera, by the in-vehicle condition recognizing unit, performs notification processing on outside of the vehicle by using the notification function based on predetermined information relating to the in-vehicle user or an action of at least one of the person and the in-vehicle user,
wherein based on a recognition result by the in-vehicle condition recognizing unit and the vehicle peripheral condition recognizing unit, the notification control unit:
stops performing the notification processing when it is determined that the in-vehicle user takes a first action, which is a predetermined action indicating that the person outside the vehicle is an acquaintance, toward the person outside the vehicle and the person outside the vehicle takes a second action, which is a predetermined action indicating that the person inside the vehicle is an acquaintance, corresponding to the first action; and
performs the notification processing when it is determined that the in-vehicle user takes the first action toward the person outside the vehicle and the person outside the vehicle does not take the second action.

2. The vehicle control system according to claim 1, wherein
the in-vehicle condition recognizing unit has a personal information acquisition part that acquires personal information of the in-vehicle user recognized, and
the notification control unit performs the notification processing when it is determined based on the personal information that the person recognized by the vehicle peripheral condition recognizing unit is an off-vehicle user having a predetermined relationship with the in-vehicle user.

3. The vehicle control system according to claim 1, wherein the processor further comprises a time measurement part that measures an elapsed time after recognizing the vehicle peripheral condition recognizing unit recognizes the person outside the vehicle, and a movement amount detection part that measures a movement amount of the person after the elapsed time elapses a first time, and
the notification control unit performs the notification processing when the elapsed time exceeds a second time and the movement amount is a predetermined value or less.

4. The vehicle control system according to claim 1, wherein
the notification control unit drives a vehicle electrical component mounted on the vehicle to perform notification processing to the outside of the vehicle by at least one of light and sound.

5. The vehicle control system according to claim 1, wherein
the notification control unit performs, as the notification processing, processing of notifying a portable terminal carried by the person outside the vehicle.

6. A vehicle control method executed by a computer to control operation of a vehicle having a notification function, the vehicle control method comprising:
a vehicle peripheral condition recognition step of recognizing a condition around the vehicle by a vehicle peripheral condition recognizing unit that recognizes the condition around the vehicle based on an image taken by an off-vehicle photographing camera which photographs a periphery of an outside of the vehicle;
an in-vehicle condition recognition step of recognizing a condition inside the vehicle by an in-vehicle condition recognizing unit that recognizes the condition inside the vehicle based on an image imaged by an in-vehicle photographing camera which photographs an inside of the vehicle; and
a notification control step of, when a person outside the vehicle is recognized, from the image taken by the off-vehicle photographing camera, in the vehicle peripheral condition recognition step and an in-vehicle user is recognized, from the image imaged by the in-vehicle photographing camera, in the in-vehicle condition recognition step, performing notification processing on outside of the vehicle by using the notification function based on predetermined information relating to the in-vehicle user or an action of at least one of the person and the in-vehicle user,
wherein in the notification control step, based on a recognition result of the in-vehicle condition recognizing step and the vehicle peripheral condition recognizing step:
stop performing the notification processing when it is determined that the in-vehicle user takes a first action, which is a predetermined action indicating that the person outside the vehicle is an acquaintance, toward the person outside the vehicle and the person outside the vehicle takes a second action, which is a predetermined action indicating that the person inside the vehicle is an acquaintance, corresponding to the first action; and
perform the notification processing when it is determined that the in-vehicle user takes the first action toward the person outside the vehicle and the person outside the vehicle does not take the second action.

* * * * *